United States Patent
Mikamo et al.

(10) Patent No.: US 8,958,951 B2
(45) Date of Patent: Feb. 17, 2015

(54) MOTOR CONTROL DEVICE AND ELECTRIC POWER STEERING APPARATUS

(71) Applicant: JTEKT Corporation, Osaka-shi, Osaka (JP)

(72) Inventors: Satoru Mikamo, Okazaki (JP); Koji Fujimoto, Kariya (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

(21) Appl. No.: 14/140,203

(22) Filed: Dec. 24, 2013

(65) Prior Publication Data

US 2014/0200767 A1 Jul. 17, 2014

(30) Foreign Application Priority Data

Jan. 11, 2013 (JP) .................................. 2013-003648

(51) Int. Cl.
*H02P 6/12* (2006.01)
*B62D 5/04* (2006.01)

(52) U.S. Cl.
CPC ................ *H02P 6/12* (2013.01); *B62D 5/0487* (2013.01); *B62D 5/0463* (2013.01)
USPC ......................................................... 701/41

(58) Field of Classification Search
USPC ......................................................... 701/41
See application file for complete search history.

(56) References Cited

U.S. PATENT DOCUMENTS

| | | | | |
|---|---|---|---|---|
| 4,762,194 A | * | 8/1988 | Morishita et al. | 180/446 |
| 7,584,816 B2 | * | 9/2009 | Miyajima et al. | 180/422 |
| 8,055,410 B2 | * | 11/2011 | Sakamaki et al. | 701/41 |
| 8,547,043 B2 | * | 10/2013 | Kuroda | 318/400.21 |
| 2002/0193935 A1 | * | 12/2002 | Hashimoto et al. | 701/110 |
| 2007/0284180 A1 | * | 12/2007 | Suehiro et al. | 180/444 |
| 2008/0004773 A1 | * | 1/2008 | Maeda | 701/41 |
| 2009/0043453 A1 | * | 2/2009 | Sakamaki et al. | 701/42 |
| 2012/0078560 A1 | | 3/2012 | Satou et al. | |
| 2012/0145472 A1 | * | 6/2012 | Imamura et al. | 180/446 |

FOREIGN PATENT DOCUMENTS

EP 1 737 116 A1 12/2006
JP A-2011-46251 3/2011

OTHER PUBLICATIONS

May 26, 2014 Extended Search Report issued in European Application No. 14150108.

\* cited by examiner

*Primary Examiner* — Thomas Tarcza
*Assistant Examiner* — Alex C Dunn
(74) *Attorney, Agent, or Firm* — Oliff PLC (57) ABSTRACT

A motor control apparatus includes a plurality of voltage detecting sections configured to each detect a terminal voltage of one of phases of a brushless motor, and a control section configured to control driving of the motor. The control section takes in, via separate signal lines, detection signals of the voltage detecting sections. When the condition that any two of terminal voltage detection values of respective phases obtained from the detection signals of the voltage detecting sections are continuously equal to each other is satisfied, the control section determines that a short circuit has occurred between any of the signal lines.

6 Claims, 7 Drawing Sheets

MOTOR CONTROL DEVICE AND ELECTRIC POWER STEERING APPARATUS

CROSS-REFERENCE TO RELATED APPLICATIONS

This application is based on and claims priority from Japanese Patent Application No. 2013-003648, filed on Jan. 11, 2013, the entire contents of which are incorporated herein by reference.

BACKGROUND OF THE INVENTION

The present invention relates to a motor control device and an electric power steering apparatus.

An electric power steering apparatus is known that aids a driver's steering operation by applying the drive force of a brushless motor to the steering mechanism of the vehicle. This electric power steering apparatus is provided with a rotation angle sensor that detects the value of a motor rotation angle, and a motor control device that controls the driving of the motor based on the detected value. In such a motor control device, if any abnormality occurs in the rotation angle sensor, the driving of the motor cannot be adequately controlled. As a measure for avoiding such a situation, a rotation angle sensorless control has been proposed, which is designed such that if abnormality occurs in the rotation angle sensor, the value of the motor rotation angle (electrical angle) is estimated based on the value of an induced voltage (counter-electromotive force) generated in the motor, and the driving of the motor is controlled based on the estimated value of the motor rotation angle. Japanese Laid-Open Patent Publication No. 2011-46251 discloses a motor control device that performs rotation angle sensorless control.

The motor control device described in Japanese Laid-Open Patent Publication No. 2011-46251 includes voltage detecting sections that detect the terminal voltages of respective phases of the motor, and a control section that controls the driving of the motor. The control section takes in the detection signals of the voltage detecting sections via separate signal lines. The control section calculates the detection values of the terminal voltages of respective phases of the motor based on the detection signals of the voltage detecting sections, and calculates the value of an induced voltage of the motor based on the calculated detection values. Subsequently, the control section estimates the value of a motor angular velocity based on the calculated induced voltage value, and calculates the change amount of the rotation angle per calculation cycle based on the calculation cycle and the estimated motor angular velocity value. The control section estimates the value of the present motor rotation angle by adding the calculated change amount in rotation angle to the motor rotation angle value estimated in the previous calculation cycle. Then, the control section controls the driving of the motor based on the estimated value of the present motor rotation angle.

SUMMARY OF THE INVENTION

In the motor control device described in Japanese Laid-Open Patent Publication No. 2011-46251, if a short circuit occurs between two of signal lines extending from the respective voltage detecting sections, detection signals taken into the control section via these two signal lines are averaged. In this case, the terminal voltage detection values of the two phases obtained from the two detection signals indicate abnormal values. As a result, the control section cannot adequately perform rotation angle sensorless control.

This problem is common not only to a motor control device that performs rotation angle sensorless control but also to a motor control device that performs various control based on the terminal voltage detection values of respective phases. For example, even in a motor control device that performs fail-safe control in which an abnormality in the motor control device is detected based on the terminal voltage detection values of respective phases and the motor is stopped when an abnormality is detected therein, fail-safe control cannot be adequately performed if any of the terminal voltage detection values of respective phases is abnormal.

Accordingly, it is an objective of the present invention to provide a motor control device capable of detecting the presence or absence of short circuits between any of signal lines connecting voltage detecting sections to a control section, and to provide an electric power steering apparatus equipped with the motor control device.

To achieve the foregoing objective and in accordance with one aspect of the present invention, a motor control device is provided that includes a plurality of voltage detecting sections configured to each detect a terminal voltage of one of phases of a brushless motor and a control section configured to control driving of the brushless motor. The control section takes in, via separate signal lines, detection signals of the voltage detecting sections. Also, the control section determines that a short circuit has occurred between any of the signal lines when the condition that any two of terminal voltage detection values of respective phases obtained from the detection signals of the voltage detecting sections are continuously equal to each other is satisfied.

If a short circuit occurs between two of the signal lines of the voltage detecting sections, the two detection signals taken in the control section via these two signal lines are averaged. Consequently, the terminal voltage detection values of the two phases obtained from the two detection signals are equalized, and this state continues. Accordingly, with the configuration described above, the presence or absence of short circuits between any of the signal lines of the voltage detecting sections can be detected.

The terminal voltage detection values of respective phases change in respective sinusoidal waveforms different in phase with respect to a motor rotation angle. Therefore, even in a normal condition in which a short circuit has not occurred between any of the signal lines connecting the voltage detecting sections to the control section, there is the possibility that terminal voltage values of two phases would be equalized depending on the motor rotation angle. For this reason, detecting the presence or absence of short circuits using the foregoing method may result in a situation in which, when the motor rotation angle is fixed while the terminal voltage detection values of two phases are equal, the control section may erroneously determine that a short circuit has occurred. In addition, when the motor is stopped, voltage is not supplied to the motor and consequently all the terminal voltage detection values of respective phases are equalized. Accordingly, in this case also, the control section may erroneously determine that a short circuit has occurred.

Thus, the control section preferably determines that a short circuit has occurred between any of the signal lines when the condition that any two of the terminal voltage detection values of respective phases are continuously equal to each other and the condition that the brushless motor is driving are satisfied.

With this configuration, erroneous determination of a short circuit, as described above, can be avoided with precision.

It is preferable that the motor control device performs rotation angle sensorless control.

That is, in the above described motor control device, the control section preferably calculates an induced voltage value of the brushless motor based on the terminal voltage detection values of respective phases, estimates a motor angular velocity value of the brushless motor based on the calculated induced voltage value, estimates a rotation angle value of the brushless motor based on the estimated motor angular velocity value, and controls driving of the brushless motor based on the estimated rotation angle value.

With this configuration, the presence or absence of short circuits between any of the signal lines connecting the voltage detecting sections to the control section can be detected without fail. Accordingly, rotation angle sensorless control can be adequately performed.

In accordance with another aspect of the present invention, an electric power steering apparatus is provided that includes the above described motor control device, a brushless motor configured to apply assist torque to a vehicle steering mechanism, and a torque detecting section configured to detect the value of steering torque applied to the steering mechanism. When the absolute value of the calculated induced voltage value is larger than a predetermined threshold, the control section estimates a rotation angle value of the brushless motor based on the estimated motor angular velocity value, and controls driving of the brushless motor based on the estimated rotation angle value and the detected steering torque value. When the absolute value of the calculated induced voltage value is equal to or smaller than the predetermined threshold, the control section estimates a rotation angle value of the brushless motor based on the detected steering torque value, and controls driving of the brushless motor based on the estimated rotation angle value and the detected steering torque value.

In the electric power steering apparatus, when a driver maintains a steering state of the steering wheel, almost no induced voltage is generated in the motor. In rotation angle sensorless control, since the motor angular velocity value is estimated based on the induced voltage value of the motor, the motor angular velocity value cannot be estimated and the change amount of the motor rotation angle cannot be calculated when induced voltage is not generated in the motor. As a result, the estimated motor rotation angle value may not be changed and hence be fixed. When the estimated motor rotation angle value is fixed as described above, a driver may feel resistance when operating the steering wheel in order to cancel a maintained steering state of the steering wheel. In contrast, with the configuration described above, when there is a possibility that the estimated motor rotation angle value would be fixed due to the fact that the induced voltage value of the motor falls to or below the threshold, the control section estimates the motor rotation angle value based on the detected steering torque value. In this case, if the driver has maintained a steering state of the steering wheel in a position other than neutral, steering torque has been acting on the steering wheel. Therefore, by estimating the motor rotation angle value based on the detected steering torque value, the estimated motor rotation angle value is prevented from being fixed. Accordingly, it is possible to eliminate resistance felt by the driver cancelling a maintained steering state of the steering wheel.

In rotation angle sensorless control as described above, when the position of rotation of the steering wheel is other than in neutral, steering torque is acting and, therefore, the estimated motor rotation angle value is prevented from being fixed. Accordingly, erroneous determination of short circuits, as described above, is prevented. However, when the steering wheel is located in neutral and the motor stops, all the terminal voltage detection values of respective phases are equalized. Therefore, in this case, there is a possibility of short circuits being erroneously determined. In this respect, in the configuration described above, the presence or absence of a short circuit is not detected by the control section unless the motor is driving. Accordingly, erroneous determination of a short circuit resulting from stoppage of the motor can be avoided, thus allowing more reliable detection of the presence or absence of short circuits between any of the signal lines of the voltage detecting sections.

In the above described motor control device, the control section preferably determines that the brushless motor is driving when the condition that a rotation angle of the brushless motor is changing is satisfied. With this configuration, it is possible to easily determine whether the motor is driving.

In the above described electric power steering apparatus, the control section preferably calculates an electric current command value and a voltage command value for the brushless motor based on the detected steering torque value and a rotation angle value of the brushless motor, and controls driving of the brushless motor based on the electric current command value and the voltage command value. Also, the control section preferably determines that the brushless motor is driving when the condition that the absolute value of the electric current command value or the absolute value of the voltage command value is larger than a predetermined value is satisfied. With this configuration, it is possible to easily determine whether the motor is driving.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

First Embodiment

First, the outline of an electric power steering apparatus will be described.

Figure 1:
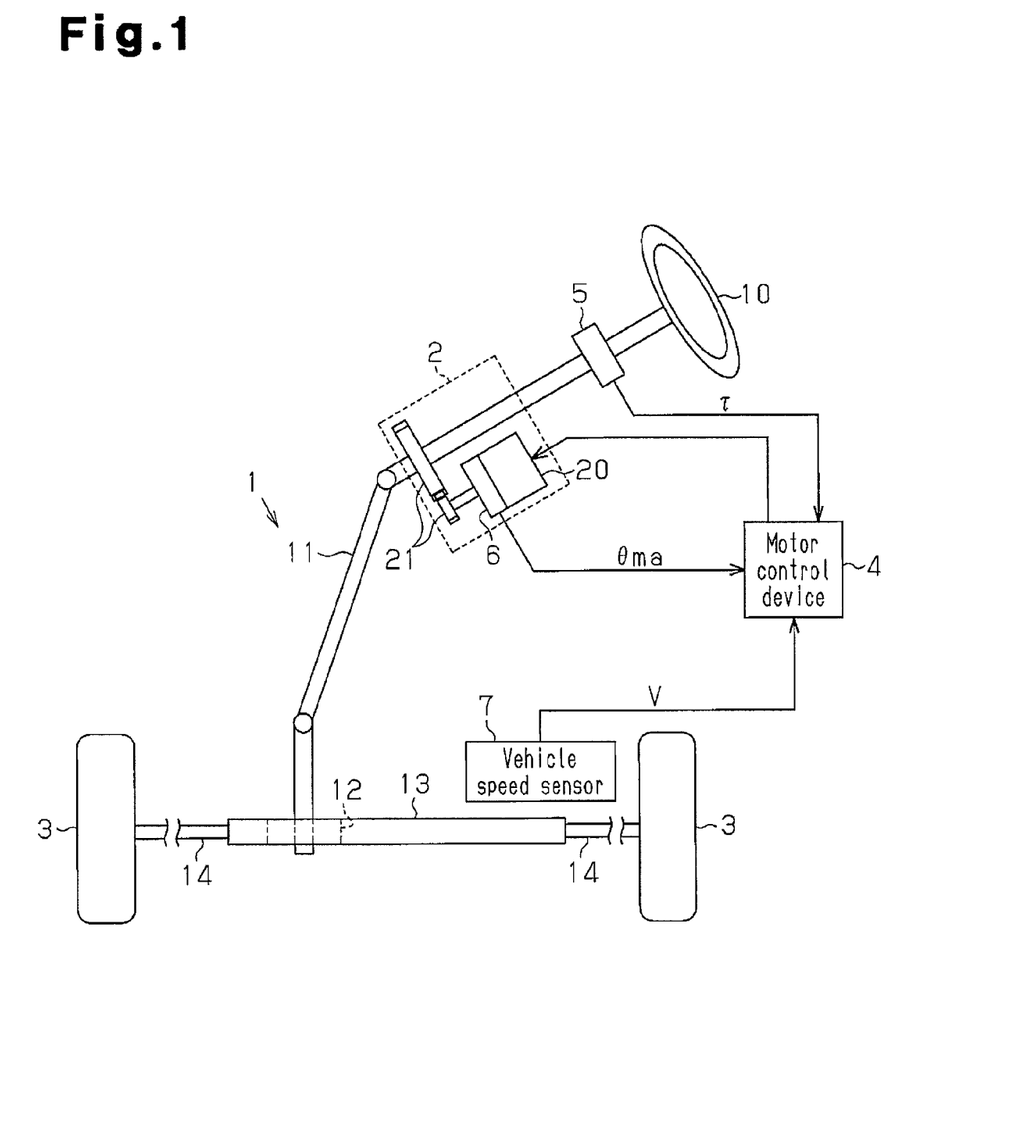
FIG. 1 is a block diagram of an outline of an electric power steering apparatus.

As shown in FIG. 1, the electric power steering apparatus includes a steering mechanism 1, which steers steerable wheels 3 based on a driver's operation of a steering wheel 10, and an assist mechanism 2, which assists a driver in performing a steering operation.

The steering mechanism 1 includes a steering shaft 11, which is a rotary shaft for the steering wheel 10, and a rack shaft 13 connected to the lower end of the steering shaft 11 via a rack and pinion mechanism 12. In the steering mechanism 1, when the steering shaft 11 rotates as a result of operation of the steering wheel 10 by a driver, the rotary motion of the shaft 11 is converted into axial reciprocal linear motion of the rack shaft 13 via the rack and pinion mechanism 12. Via tie rods 14 connected to opposite ends of the rack shaft 13, the reciprocal linear motion of the rack shaft 13 is transmitted to the steerable wheels 3, the steered angle of each steerable wheel 3 is consequently changed, and thus the traveling direction of the vehicle is changed.

The assist mechanism 2 has a motor 20 that applies assist torque to the steering shaft 11. The motor 20 is a three-phase brushless motor. The rotation of the motor 20 is transmitted to the steering shaft 11 via a gear mechanism 21. Thereby, the motor torque is applied to the steering shaft 11 and a steering operation is thus assisted.

This electric power steering apparatus is provided with various sensors that detect the amount of operation of the steering wheel 10 and state quantities of the vehicle. For instance, the steering shaft 11 is provided with a torque sensor (torque detecting section) 5 that detects the value τ of torque applied to the steering shaft 11 (steering torque value). The motor 20 is provided with a rotation angle sensor 6 that detects the rotation angle (electrical angle) θma. The vehicle is provided with a vehicle speed sensor 7 that detects its travelling speed V. Outputs from these sensors 5 to 7 are taken into a motor control device 4. The motor control device 4 controls the driving of the motor 20 based on outputs from the sensors 5 to 7.

Figure 2:
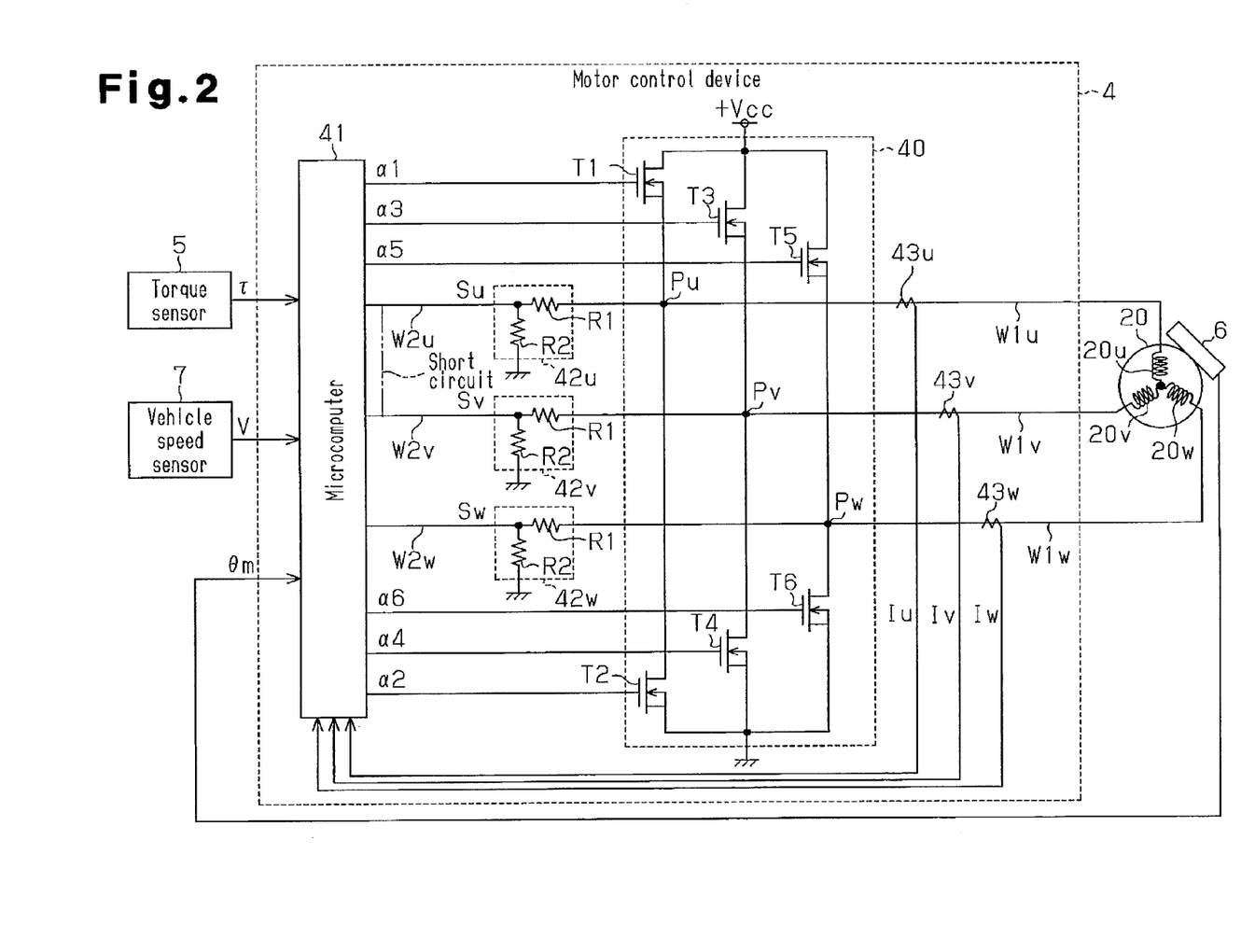
FIG. 2 is a block diagram of the configuration of a motor control device according to a first embodiment of the present invention.

As shown in FIG. 2, the motor control device 4 includes a drive circuit 40 that supplies three-phase AC voltage to the motor 20, and a microcomputer 41 that drives the drive circuit 40 by pulse width modulation (PWM). In this embodiment, the microcomputer 41 serves as a control section.

The drive circuit 40 includes a series circuit of transistors T1 and T2, a series circuit of transistors T3 and T4, and a series circuit of transistors T5 and T6. The series circuits are connected in parallel with one another. The midpoint Pu between the transistors T1 and T2, the midpoint Pv between the transistors T3 and T4, and the midpoint Pw between the transistors T5 and T6 are connected to the coils 20u, 20v, and 20w of respective phases, respectively, of the motor 20 via their corresponding power supply lines, W1u to W1w. In this drive circuit 40, the transistors T1 to T6 are switched based on corresponding PWM drive signals, α1 to α6, from the microcomputer 41. Thereby, DC voltage supplied from a power source (power source voltage +Vcc) such as an in-vehicle battery is converted into AC voltage of three phases (U phase, V phase, and W phase). The three-phase AC voltage obtained as a result of the conversion is supplied to the motor coils 20u to 20w of respective phases via the corresponding power supply lines, W1u to W1w, and consequently the motor 20 is driven.

Voltage sensors (voltage detecting sections) 42u to 42w that detect the terminal voltages of respective phases of the motor 20 are connected to the respective midpoints Pu to Pw of the corresponding transistors T1 to T6. Each of the voltage sensors 42u to 42w divides a corresponding terminal voltage of respective phases of the motor through voltage dividing resistors R1 and R2. These divided voltage values are output from corresponding signal lines, W2u to W2w, as corresponding detection signals, Su to Sw. The signal lines W2u to W2w are connected to the microcomputer 41. The microcomputer 41 takes in the respective detection signals Su to Sw of the voltage sensors 42u to 42w via the corresponding signal lines W2u to W2w.

Current sensors 43u to 43w that detect current values Iu to Iw of respective phases are provided for the power supply lines W1u to W1w respectively. Outputs from the current sensors 43u to 43w are taken into the microcomputer 41. The respective outputs from the torque sensor 5, vehicle speed sensor 7, and rotation angle sensor 6 are also taken into the microcomputer 41.

Figure 3:
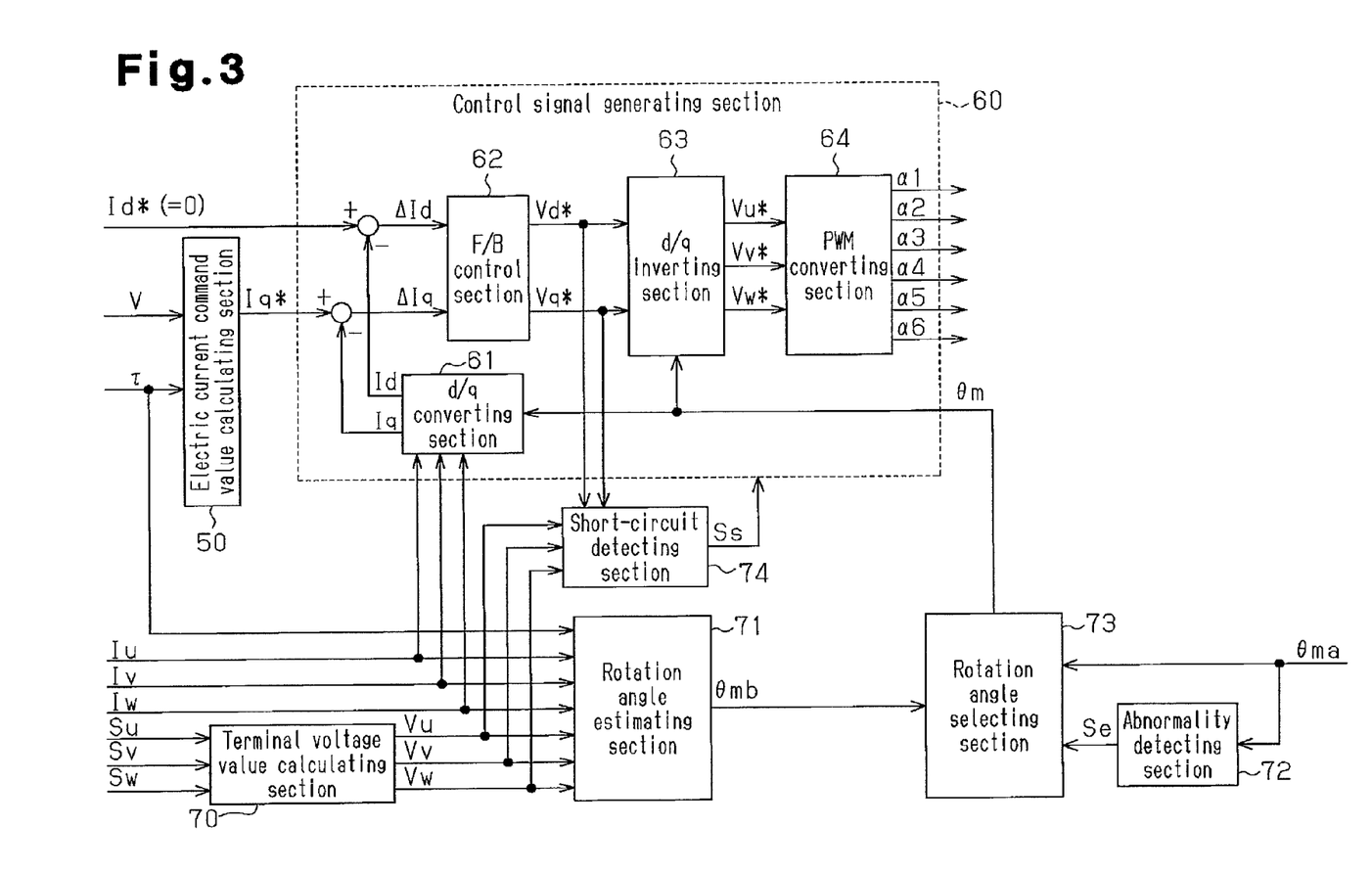
FIG. 3 is a control block diagram of the configuration of a microcomputer of the motor control device according to the first embodiment.

As shown in FIG. 3, the microcomputer 41 includes an electric current command value calculating section 50 that calculates electric current command values corresponding to target assist torques, and a control signal generating section 60 that generates PWM drive signals α1 to α6 corresponding to the electric current command values.

The electric current command value calculating section 50 calculates a q-axis electric current command value Iq*, which is an electric current command value on the q axis in a d/q coordinate system based on a vehicle speed V and a steering torque value τ. Specifically, for example, as the absolute value of the steering torque value τ increases and the vehicle speed V decreases, the absolute value of the q-axis electric current command value Iq* is set to a greater value. In the microcomputer 41, a d-axis electric current command value Id* is set at 0.

The current values Iu to Iw of respective phases and motor rotation angle (electrical angle) θm are also input to the control signal generating section 60. The motor rotation angle θm is set by a rotation angle selecting section 73 to either a motor rotation angle θma detected by the rotation angle sensor 6 or a motor rotation angle θmb (electrical angle) estimated by a rotation angle estimating section 71. The control signal generating section 60 performs current feedback control in the d/q coordinate system based on these items of information input, thereby generating PWM drive signals α1 to α6.

Specifically, the current values Iu to Iw of respective phases and motor rotation angle θm are input to a d/q converting section 61. The d/q converting section 61 maps the current values Iu to Iw of respective phases onto the d/q coordinates based on the motor rotation angle θm, thereby calculating a d-axis current value Id and q-axis current value Iq that are the actual current values of the motor 20 in the d/q coordinate system. Then, the deviation ΔId of the d-axis current value Id from the d-axis electric current command value Id* is calculated, and the value is input to a feedback (F/B) control section 62. Additionally, the deviation ΔId of the q-axis current value Iq from the q-axis electric current command value Iq* is also calculated and the value is input to the F/B control section 62.

The F/B control section 62 calculates a d-axis voltage command value Vd* by performing current feedback control based on the d-axis current deviation ΔId so that the d-axis current value Id follows the d-axis electric current command value Id*. Additionally, the F/B control section 62 also calculates a q-axis voltage command value Vq* by performing current feedback control based on the q-axis current deviation ΔIq so that the q-axis current value Iq follows the q-axis electric current command value Iq*. The F/B control section 62 outputs the d-axis voltage command value Vd* and q-axis voltage command value Vq* thus calculated to a d/q inverting section 63.

The motor rotation angle θm is also input to the d/q inverting section 63. The d/q inverting section 63 maps the d-axis voltage command value Vd* and q-axis voltage command value Vq* onto a three-phase AC coordinate system based on the motor rotation angle θm, thereby calculating voltage command values Vu* to Vw* of respective phases in a three-phase AC coordinate system. The d/q inverting section 63 outputs the voltage command values Vu* to Vw* of respective phases thus calculated to a PWM converting section 64.

The PWM converting section 64 PWM-converts voltage command values Vu* to Vw* of respective phases, thereby generating PWM drive signals α1 to α6. Then, as shown in FIG. 2, the microcomputer 41 applies these PWM drive signals α1 to α6 to the respective gate terminals of the transistors T1 to T6, respectively, of the drive circuit 40. Thus, drive powers corresponding to the PWM drive signals α1 to α6 are supplied to the motor 20, thus performing assist control in which motor torque is applied to the steering shaft 11.

Additionally, the microcomputer 41 performs a rotation angle sensorless control in which if any abnormality occurs in the rotation angle sensor 6, drive control of the motor 20 continues using the voltage sensors 42u to 42w. Next, rotation angle sensorless control will be described in detail.

As shown in FIG. 3, the microcomputer 41 has a terminal voltage value calculating section 70 that calculates the terminal voltages of respective phases (more specifically, the detection values) of the motor 20 based on the respective detection values Su to Sw of the voltage sensors 42u to 42w respectively. The terminal voltage value calculating section 70 outputs the terminal voltage detection values Vu to Vw of respective phases thus calculated to the rotation angle estimating section 71.

A steering torque value τ and current values Iu to Iw of respective phases are also input to the rotation angle estimating section 71. The rotation angle estimating section 71 estimates the motor rotation angle θmb based on the information input, and outputs the estimated motor rotation angle θmb to the rotation angle selecting section 73.

The microcomputer 41 has an abnormality detecting section 72 that detects an abnormality in the rotation angle sensor 6 based on the motor rotation angle θma detected by the rotation angle sensor 6. When an abnormality in the rotation angle sensor 6 is detected, the abnormality detecting section 72 outputs an abnormality detection signal Se indicating the abnormality to the rotation angle selecting section 73.

A rotation angle θma detected by the rotation angle sensor 6 is also input to the rotation angle selecting section 73. When the rotation angle sensor 6 is normal, the rotation angle selecting section 73 outputs the motor rotation angle θma detected by the rotation angle sensor 6 to the control signal generating section 60 as a motor rotation angle θm. If the rotation angle selecting section 73 receives an abnormality detection signal Se output from the abnormality detecting section 72, it outputs the estimated motor rotation angle θmb to the control signal generating section 60 as a motor rotation angle θm. In the microcomputer 41, as described above, drive control of the motor 20 is performed with the rotation angle sensor 6 when the rotation angle sensor 6 is normal, while drive control of the motor 20 continues without the rotation angle sensor 6 if any abnormality occurs in the rotation angle sensor 6.

Figure 4:
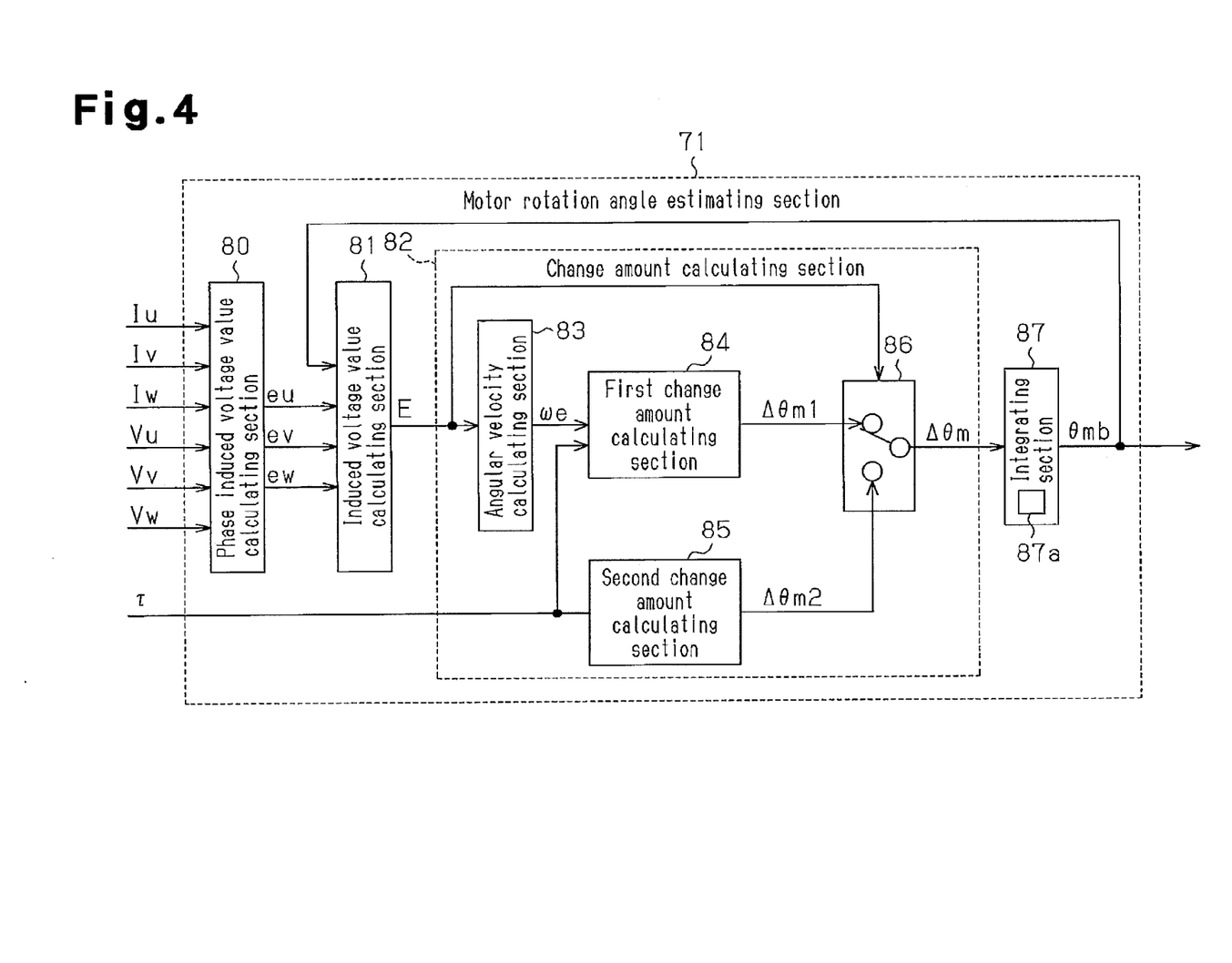
FIG. 4 is a control block diagram of the configuration of a motor rotation angle estimating section of the motor control device according to the first embodiment.

Next, the rotation angle estimating section 71 is described in detail.

As shown in FIG. 4, the rotation angle estimating section 71 has a phase induced voltage value calculating section 80 that calculates induced voltage values eu, ev, and ew of respective phases based on current values Iu, Iv, and Iw of respective phases and terminal voltage detection values Vu, Vv, and Vw of respective phases. Using the expressions (1), (2), and (3) given below, the phase induced voltage value calculating section 80 calculates the induced voltage values eu, ev, and ew of respective phases, respectively, in the three-phase AC coordinate system. In the expressions, Ru, Rv, and Rw represent the respective resistance values of the motor coils 20u, 20v, and 20w of respective phases. Additionally, Vm represents a midpoint voltage, and Vm=(Vu+Vv+Vw)/3.

$$eu = Vu - Iu \cdot Ru - Vm \quad (1)$$

$$ev = Vv - Iv \cdot Rv - Vm \quad (2)$$

$$ew = Vw - Iw \cdot Rw - Vm \quad (3)$$

The phase induced voltage value calculating section 80 outputs the calculated induced voltage values eu, ev, and ew of respective phases to an induced voltage value calculating section 81.

The estimated motor rotation angle θmb estimated in the previous calculation cycle is also input to the induced voltage value calculating section 81. The induced voltage value calculating section 81 converts induced voltage values of three phases eu, ev, and ew into two-phase induced voltage values ed and eq in a two-phase d/q coordinate system based on the estimated motor rotation angle θmb. Using the expression (4) given below, the induced voltage value calculating section 81 calculates an induced voltage value E of the motor 20.

$$E = \sqrt{(ed^2 + eq^2)} \quad (4)$$

The induced voltage value calculating section 81 outputs the calculated induced voltage value E of the motor 20 to a change amount calculating section 82.

A steering torque value τ is also input to the change amount calculating section 82. Based on the information input, the change amount calculating section 82 calculates the change amount in motor rotation angle Δθm.

Specifically, the change amount calculating section 82 includes an angular velocity calculating section 83 that estimates the motor angular velocity value ωe based on an induced voltage value E. The angular velocity calculating section 83 estimates the motor angular velocity ωe using the expression (5) given below. In the expression, Ke represents an induced voltage constant (inverse constant).

$$\omega e = E/Ke \quad (5)$$

The angular velocity calculating section 83 then outputs the estimated motor angular velocity ωe to a first change amount calculating section 84.

The first change amount calculating section 84 multiplies the estimated motor angle speed ωe by the calculation cycle, thereby obtaining a first change amount Δθm1 indicating the change amount in motor rotation angle per calculation cycle. Additionally, a steering torque value τ is input to the first change amount calculating section 84. The plus or minus sign of the steering torque value τ is regarded as the direction of rotation of the motor 20, and the plus or minus sign of the first change amount Δθm1 is determined.

On the other hand, the change amount calculating section 82 includes a second change amount calculating section 85, which subjects a second change amount Δθm2 indicating the amount of change in motor rotation angle per calculation cycle to map calculation based on the steering torque value τ. The map indicating the relationship between the steering torque value τ and the second change amount Δθm2 is prepared in advance based on experimentation or the like.

Additionally, the change amount calculating section 82 includes a switching section 86 that sets a motor rotation angle change amount Δθm, which is output from the section 82, to a first change amount Δθm1 or a second change amount Δθm2. The induced voltage value E calculated in the induced voltage value calculating section 81 is input to the switching section 86. If the induced voltage value E is larger than a predetermined threshold Ea (Ea>0), the switching section 86 sets the motor rotation angle change amount Δθm to the first change amount Δθm1. In contrast, if the induced voltage value E is equal to or smaller than the threshold Ea, the switching section 86 sets the motor rotation angle change amount Δθm to the second change amount Δθm2. The change amount calculating section 82 outputs the motor rotation angle change amount Δθm thus set to an addition section 87.

The addition section 87 includes a memory 87a for storing the value of the estimated motor rotation angle Δθmb obtained in the previous calculation cycle. The addition section 87 adds the motor rotation angle change amount Δθm to the motor rotation angle θmb estimated in the previous calculation cycle, thereby calculating the estimated value of the present motor rotation angle θmb, and outputs the result.

By virtue of such a configuration of the rotation angle estimating section 71, when the induced voltage value E is larger than the predetermined threshold Ea, the estimated motor rotation angle θmb is calculated based on the induced voltage value E of the motor 20. Incidentally, in the electric power steering apparatus, when the driver maintains the steering state of the steering wheel 10, almost no induced voltage is generated in the motor 20. In this case, since the first change amount Δθm1 cannot be calculated based on the induced voltage value E, the value of the estimated motor rotation angle θmb is not changed and hence is fixed. When the estimated motor rotation angle θmb is once fixed as described above, the driver may feel resistance when operating the steering wheel 10 in order to cancel the maintained steering state of the steering wheel 10. In contrast, in the rotation angle estimating section 71, when there is a possibility that the value of the estimated motor rotation angle would be fixed due to the fact that the induced voltage value E falls to or below the threshold Ea, a motor rotation angle change amount Δθm is calculated based on the steering torque value τ. In this case, if the driver has maintained the steering state of the steering wheel 10 in a position other than neutral, steering torque has been acting on the steering wheel 10. Therefore, by calculating the motor rotation angle change amount Δθm based on the steering torque angle τ, the value of the estimated motor rotation angle θmb is prevented from being fixed when the steering wheel 10 is maintained in a position other than neutral. Accordingly, it is possible to eliminate resistance felt by the driver cancelling the maintained steering state of the steering wheel 10.

On the other hand, as shown in FIG. 3, the microcomputer 41 includes a short-circuit detecting section 74 that detects the presence or absence of short-circuits between any of the signal lines W2u to W2w of the voltage sensors 42u to 42w during rotation angle sensorless control. Next will be described the principle of detection of presence/absence of short-circuits by the short-circuit detecting section 74.

For instance, as indicated by the broken line in which a long dash alternates with a pair of short dashes in FIG. 2, if a short circuit occurs between the signal line W2u of the voltage sensor 42u and the signal line W2v of the voltage sensor 42v, the detection signals Su and Sv taken into the microcomputer 41 via these signal lines W2u and W2v are averaged. Consequently, the terminal voltage detection values Vu and Vv of two phases calculated by the terminal voltage value calculating section 70 shown in FIG. 3 are equalized, and this state is maintained.

Therefore, in the short-circuit detecting section 74, when the condition that the terminal voltage detection values Vu and Vv of two phases are continuously equal is satisfied, it is determined that a short circuit has occurred between the signal lines W2u and W2v. Specifically, a determination whether the terminal voltage detection values Vu and Vv of two phases are equal is made through a determination whether these terminal voltage detection values Vu and Vv of two phases satisfy the relationship |Vu−Vv|<Va with respect to a predetermined value Va (Va>0), while taking detection error and so on into account. The predetermined value Va is set based on experimentation or the like so that a determination can be made whether the terminal voltage detection values Vu and Vv of two phases are equal. If conditions satisfying the relationship |Vu−Vv|<Va continue for a predetermined time Ta or longer, it is determined that a short circuit has occurred between the signal lines W2u and W2v. The presence or absence of a short circuit between the signal lines W2v and W2w, and the presence or absence of a short circuit between the signal lines W2w and W2u are detected in the same method as that described above.

Figure 5:
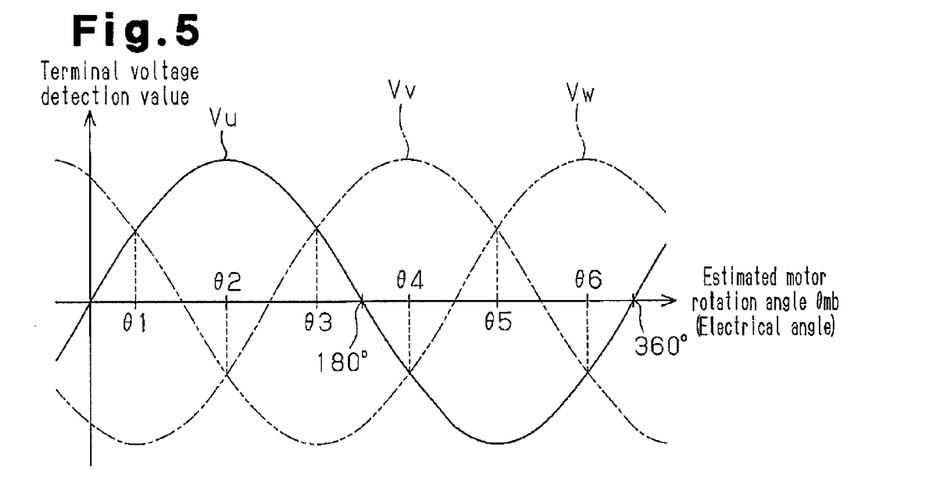
FIG. 5 is a graph representing the relationship between the estimated motor rotation angle value and the terminal voltage detection values of respective phases when the motor is driving, in the motor control device according to the first embodiment.

On the other hand, detection of presence or absence of short circuits using such a method may result in erroneous determination of short circuits by the short-circuit detecting section 74, depending on the value of the estimated motor rotation angle θmb. To be more specific, as shown in FIG. 5, the terminal voltage detection values Vu to Vw of respective phases change in respective sinusoidal waveforms different in phase with respect to an estimated motor rotation angle θmb. Therefore, if the value of the estimated motor rotation angle θmb is equal to any predetermined angle θ1 to θ6, indicated in FIG. 5, even in a normal condition in which a short circuit has not occurred, the terminal voltage values of two phases are equalized. For this reason, detecting the presence or absence of short circuits using the foregoing method may result in a situation in which, when the estimated motor rotation angle θmb is fixed at any one of the predetermined angles θ1 to θ6, the short-circuit detecting section 74 may detect a short circuit erroneously.

However, by performing rotation angle sensorless control described above, the motor rotation angle change amount Δθm is calculated when the position of rotation of the steering wheel 10 is other than in neutral. Therefore, the value of the estimated rotation angle θmb is prevented from being fixed. Accordingly, the short-circuit detecting section 74 is prevented from making erroneous determination of short circuits, as described above.

However, when the steering wheel 10 is located in neutral and the motor 20 stops, all the terminal voltage detection values Vu to Vw of respective phases are equalized (e.g, 0[V]). Therefore, in this case also, there is a possibility of short circuits being erroneously determined.

In view of the foregoing drawback, the short-circuit detecting section 74 determines, based on the d-axis voltage command value Vd* and q-axis voltage command value Vq*, whether the motor 20 is driving. Only when the condition that the motor 20 is driving is satisfied, does the short-circuit detecting section 74 detect the presence or absence of short circuits.

Figure 6:
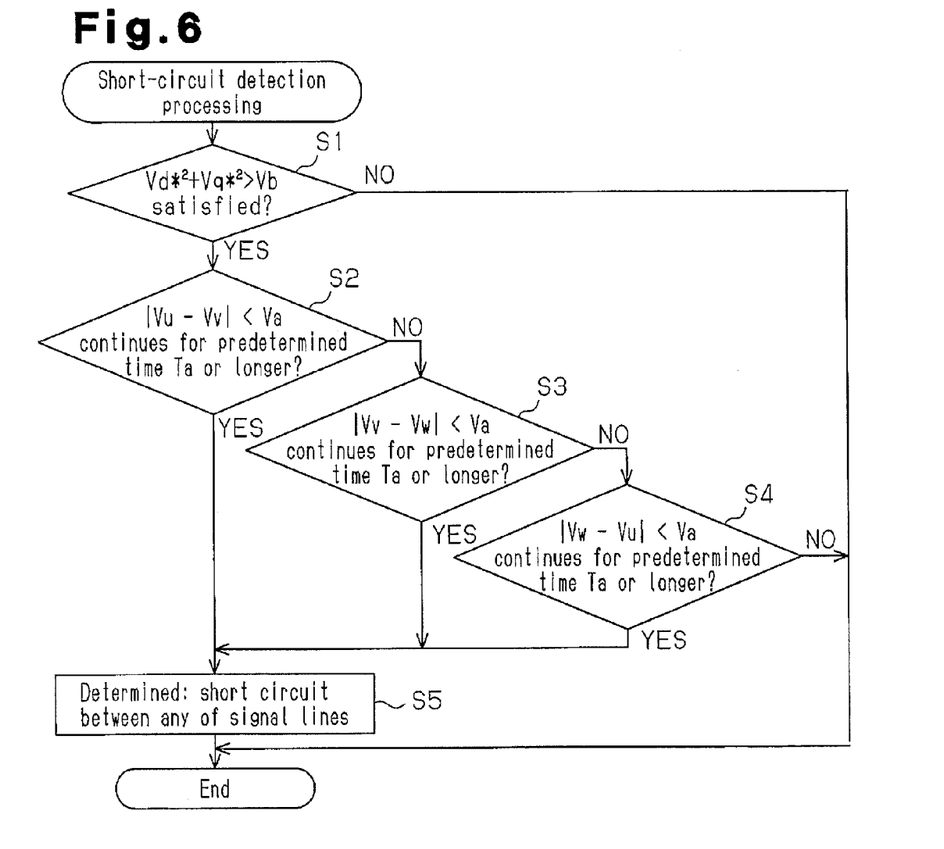
FIG. 6 is a flowchart illustrating a procedure for short-circuit detection processing performed by a short-circuit detecting section, in the motor control device according to the first embodiment.

The procedure for short-circuit detection processing performed by the short-circuit detecting section 74 and its operation will be described below with reference to FIG. 6. The process in FIG. 6 is repeated in a predetermined calculation cycle during rotation angle sensorless control.

First in step S1, the short-circuit detecting section 74 determines whether a d-axis voltage command value Vd* and q-axis voltage command value Vq* satisfy the relationship Vd*² + Vq*² > Vb with respect to the predetermined value Vb (Vb>0). The predetermined value Vb is set in advance based on experimentation or the like so that a determination whether the motor 20 is driving can be determined. If the determination in step S1 is positive, the short-circuit detecting section 74 determines that the motor 20 is driving. Then, in the next step S2, a determination is made whether the terminal voltage detection values Vu and Vv of two phases satisfy the relationship |Vu−Vv|<Va continuously for a predetermined time Ta or longer. If the determination in step S2 is negative, a determination is made in the next step S3 whether the terminal voltage values Vv and Vw of two phases satisfy the relationship |Vv−Vw|<Va continuously for the predetermined time Ta or longer. If the determination in step S3 is negative, a determination is made in the next step S4 whether the terminal voltage detection values Vw and Vu of two phases satisfy the |Vw−Vu|<Va continuously for the predetermined time Ta or longer. If the determination in any of steps S2 to S4 is positive, the short-circuit detecting section 74 determines in the next step S5 that a short circuit has occurred between any of the signal lines W2u to W2w of the voltage sensors 42u to 42w.

For example, if the terminal voltage detection values Vu and Vv of two phases are equalized due to a short circuit between the signal lines W2u and W2v of the voltage sensors 42u and 42v, respectively, the determination made in step S2 is positive and, therefore, the short-circuit detecting section 74 is able to detect the short circuit between the signal lines W2u and W2v. Equally, a short circuit between the signal lines W2v and W2w of the voltage sensors 42v and 42w, respectively, and a short circuit between the signal lines W2w and W2u of the voltage sensors 42w and 42u, respectively, can also be detected in the same manner by the short-circuit detecting section 74.

Additionally, as shown in FIG. 3, if determining that a short circuit has occurred between any of the signal lines W2u to W2w of the voltage sensors 42u to 42w, the short-circuit detecting section 74 outputs a short-circuit detection signal Ss, indicting a short circuit having occurred, to the control signal generating section 60. If receiving a short-circuit detection signal Ss output from the short-circuit detecting section 74, the control signal generating section 60, for example, interrupts the generation of PWM drive signals α1 to α6, thereby performing fail-safe control to stop the motor 20.

On the other hand, as shown in FIG. 6, if the determination made by the short-circuit detecting section 74 in step S4 is negative, that is, if it is determined that a short circuit has not occurred between any of the signal lines W2u to W2w of the voltage sensors 42u to 42w, the series of processes are terminated.

Also, if the determination made by the short-circuit detecting section 74 in step S1 is negative, that is, if the determination is also made that the motor 20 is not driving, the series of processes is terminated. Accordingly, it is possible to avoid with precision a situation in which all the terminal voltage detection values Vu to Vw of respective phases are equalized due to stoppage of the motor from being erroneously determined as a short circuit.

As described above, the electric power steering apparatus according to the present embodiment yields the advantages described below.

(1) In the microcomputer 41, if both the condition that two of the terminal voltage detection values Vu to Vw of respective phases are continuously equal and the condition that the motor 20 is driving are satisfied, it is determined that a short circuit has occurred between any of the signal lines W2u to W2w of the voltage sensors 42u to 42w. Accordingly, during rotation angle sensorless control it is possible to detect with precision short circuits between any of the signal lines W2u to W2w.

Second Embodiment

Next, a second embodiment of the present invention will be described. An electric power steering apparatus according to the second embodiment differs from the electric power steering apparatus according to the first embodiment in the following respect. That is, the presence or absence of a short circuit between any of the signal lines W2u to W2w of the voltage sensors 42u to 42w respectively is detected before the microcomputer 41 performs rotation angle sensorless control, that is, when a rotation angle sensor 6 is normal. The differences between the present embodiment and the first embodiment will be mainly described below.

Figure 7:
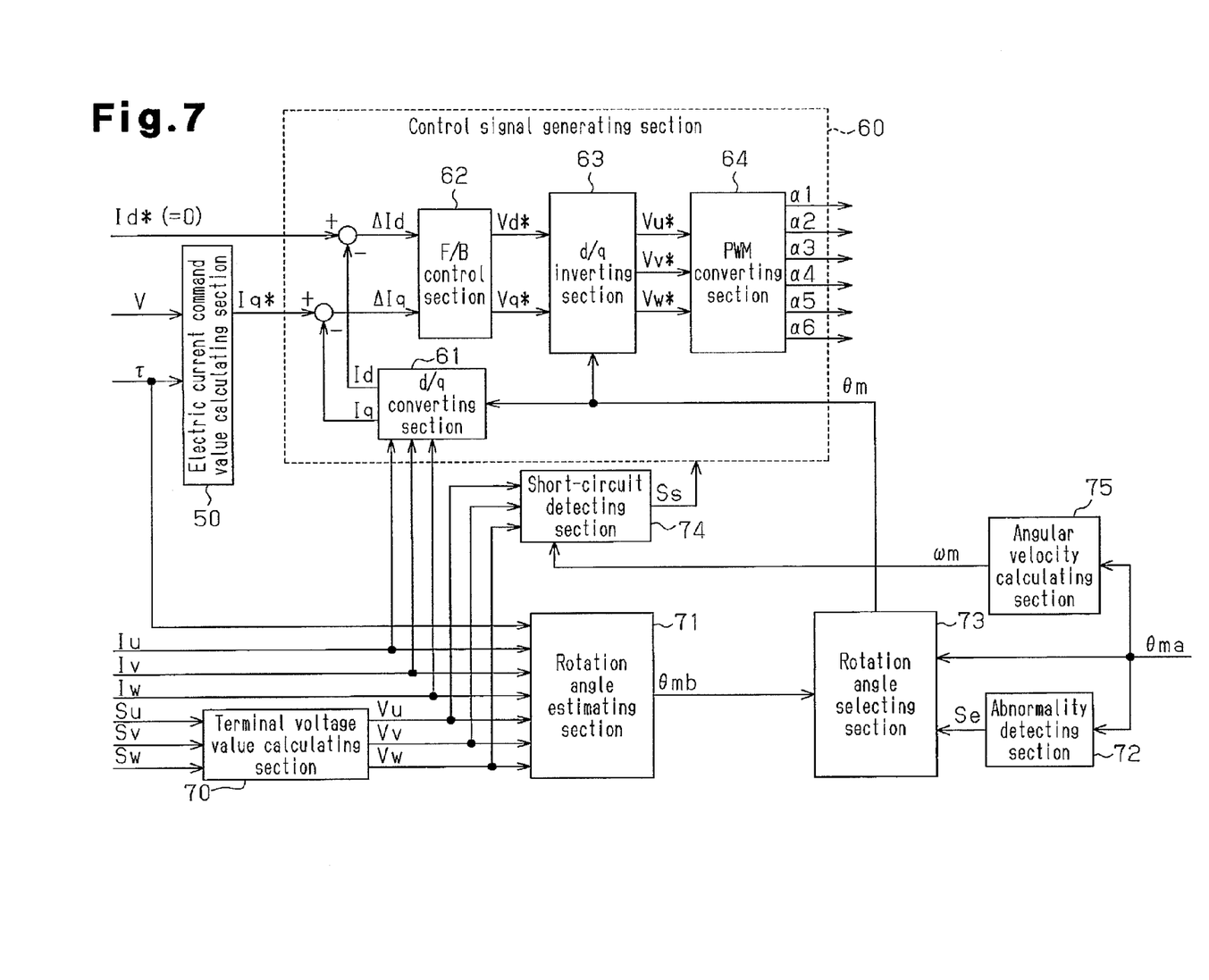
FIG. 7 is a control block diagram of the configuration of a microcomputer of a motor control device according to a second embodiment of the present invention.

As shown in FIG. 7, the microcomputer 41 includes an angular velocity calculating section 75 that calculates a motor angular velocity ωm based on a motor rotation angle θma detected by the rotation angle sensor 6. The angular velocity calculating section 75 takes in, for example a motor rotation angle θma detected in a predetermined detection cycle, and divides the change amount in the motor rotation angle θma detected in the detection cycle, by this detection cycle, thereby calculating a motor angular velocity ωm. The angular velocity calculating section 75 outputs the calculated motor angular velocity ωm to the short-circuit detecting section 74.

The short-circuit detecting section 74 detects the presence or absence of a short circuit between any of the signal lines W2u to W2w of the voltage sensors 42u to 42w based on the motor angular velocity ωm and terminal voltage detection values Vu to Vw of respective phases.

Figure 8:
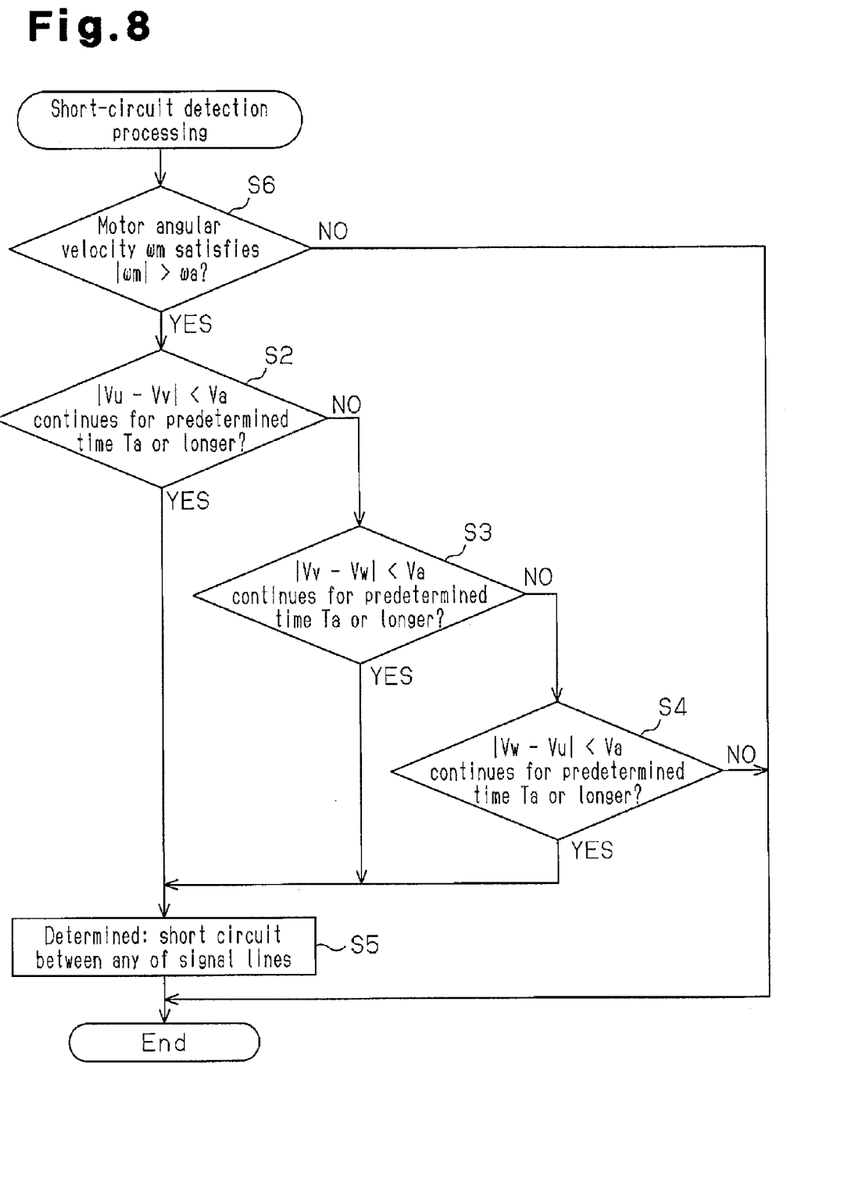
FIG. 8 is a flowchart illustrating a procedure for short-circuit detection processing performed by a short-circuit detecting section, in the motor control device according to the second embodiment.

Next, the procedure for short-circuit detection processing performed by the short-circuit detecting section 74 will be described with reference to FIG. 8. The process shown in FIG. 8 is performed when the rotation angle sensor 6 is normal.

First in step S6, the short-circuit detecting section 74 determines whether a motor angular velocity ωm satisfies the relationship |ωm|>ωa with respect to a predetermined value ωa (ωa>0). The predetermined value ωa is set based on experimentation or the like so that a determination whether a motor rotation angle is changing can be made. If the determination made in step S6 is positive, the microcomputer 41 determines that the motor rotation angle has changed and the motor 20 is driving. Therefore, as in the process shown in FIG. 6 of the first embodiment, the microcomputer 41 performs a short-circuit determination process based on a comparison among the phase terminal voltage detection values Vu to Vw of respective phases as shown in steps S2-S5. In contrast, if the determination made in step 6 is negative, the microcomputer 41 determines that the motor rotation angle has not changed, and terminates the series of processes.

Next, operation of the electric power steering apparatus according to the second embodiment will be described with reference to FIG. 5. In the description below, the estimated motor rotation angle θmb on the horizontal axis in FIG. 5 is replaced by a motor rotation angle θma detected by the rotation angle sensor 6.

In short-circuit determination based on a comparison among terminal voltage detection values Vu to Vw of respective phases, if the detected motor rotation angle θma is fixed at one of the predetermined angles θ1 to θ6 shown in FIG. 5, or if all the terminal voltage detection values Vu to Vw of respective phases are equalized as a result of stoppage of the motor 20, the short-circuit detecting section 74 may detect a short circuit erroneously.

In this respect, in the second embodiment, if the absolute value |ωm| of the motor angular velocity becomes equal to or smaller than the predetermined value ωa as a result of fixing the detected motor rotation angle θma or stopping the motor 20, the short-circuit detecting section 74 does not carry out a short-circuit determination based on a comparison among the terminal voltage detected values Vu to Vw of respective phases. Accordingly, the presence or absence of a short circuit between any of the signal lines W2u to W2w of the voltage sensors 42u to 42w can be determined with precision.

As described above, the electric power steering apparatus according to the second embodiment yields the advantage (2) described below, instead of the advantage (1) yielded by the first embodiment.

(2) In the microcomputer 41, if both the condition that two of the terminal voltage detection values Vu to Vw of respective phases are equal continuously and the condition that the motor rotation angle has changed are satisfied, it is determined that a short circuit has occurred between any of the signal lines W2u to W2w of the voltage sensors 42u to 42w. Accordingly, it is possible to detect the presence or absence of a short circuit between any of the signal lines W2u to W2w of the voltage sensors 42u to 42w at an early stage when the rotation angle sensor 6 is normal.

Other Embodiments

The embodiments described above may be modified as described below.

In the first embodiment, if the d-axis voltage command value Vd* and the q-axis voltage command value Vq* satisfy the relationship $Vd^{*2}+Vq^{*2}>Vb$ with respect to a predetermined value Vb, a determination is made that the motor 20 is driving. Instead of this, if the voltage command values Vu* to Vw* of respective phases satisfy the relationship $Vu^{*2}+Vv^{*2}+Vw^{*2}>Vc$ with respect to a predetermined value Vc, a determination may be made that the motor 20 is driving. Alternatively, if either the absolute value |Vd*| of the d-axis voltage command value or the absolute value |Vq*| of the q-axis command voltage value is larger than a predetermined value, a determination may be made that the motor 20 is driving. Alternatively, if any of the respective absolute values |Vu*|, |Vv*|, and |Vw*| of the voltage command values of respective phases is larger than a predetermined value, a determination may be made that the motor 20 is driving. Equally, if the absolute value |Iq*| of the q-axis electric current command value is larger than a predetermined value, a determination may be made that the motor 20 is driving.

In the second embodiment, a determination is made based on the motor angular velocity ωm whether the motor rotation angle is changing. Instead of this, based on, for example, the angular velocity of the steering shaft 11, the determination may be made whether the motor rotation angle is changing.

In the method for detecting the presence or absence of short circuits between any of the signal lines W2u to W2w of the voltage sensors 42u to 42w based on the motor angular velocity ωm, as in the second embodiment, it is possible to detect with precision the presence or absence of short circuits between any of signal lines W2u to W2w regardless of whether the motor control device 4 performs rotation angular sensorless control. Accordingly, the motor control device 4 used in the second embodiment as an example may be applied to a motor control device that does not perform rotation angle sensorless control, or in a motor control device provided for an apparatus other than the electric power steering apparatus.

In the first and second embodiment, if only the condition that two of the terminal voltage detection values Vu to Vw of respective phases are continuously equal is satisfied, a determination may be made that a short circuit has occurred between any of the signal lines W2u to W2w of the voltage sensors 42u to 42w. Specifically, in the first embodiment, the process in step S1 may by omitted from the short-circuit detection processing exemplified in FIG. 6. In the second embodiment, the process in step S6 may be omitted from the short-circuit detection processing exemplified in FIG. 8.

The invention claimed is:

1. A motor control device comprising:
a plurality of voltage detecting sections, each of which is configured to detect a terminal voltage of one of phases of a brushless motor, wherein the brushless motor comprises a plurality of coils and a plurality of terminals, the terminals are respectively connected to the coils, and the terminal voltage is a voltage of one of the terminals; and
a control section configured to control driving of the brushless motor, wherein
the control section takes in, via separate signal lines, detection signals of the voltage detecting sections, and
the control section determines that a short circuit has occurred between any of the signal lines when the condition that any two of terminal voltage detection values of respective phases obtained from the detection signals of the voltage detecting sections are continuously equal to each other is satisfied.

2. The motor control device according to claim 1, wherein the control section determines that a short circuit has occurred between any of the signal lines when the condition that any two of the terminal voltage detection values of respective phases are continuously equal to each other and the condition that the brushless motor is driving are satisfied.

3. The motor control device according to claim 2, wherein the control section
calculates an induced voltage value of the brushless motor based on the terminal voltage detection values of respective phases,
estimates an motor angular velocity value of the brushless motor based on the calculated induced voltage value,
estimates a rotation angle value of the brushless motor based on the estimated motor angular velocity value, and
controls driving of the brushless motor based on the estimated rotation angle value.

4. An electric power steering apparatus comprising:
the motor control device according to claim 3;
a brushless motor configured to apply assist torque to a vehicle steering mechanism; and
a torque detecting section configured to detect the value of steering torque applied to the steering mechanism, wherein
when the absolute value of the calculated induced voltage value is larger than a predetermined threshold, the control section estimates a rotation angle value of the brushless motor based on the estimated motor angular velocity value, and controls driving of the brushless motor based on the estimated rotation angle value and the detected steering torque value, and
when the absolute value of the calculated induced voltage value is equal to or smaller than the predetermined threshold, the control section estimates a rotation angle value of the brushless motor based on the detected steering torque value, and controls driving of the brushless motor based on the estimated rotation angle value and the detected steering torque value.

5. The motor control device according to claim 2, wherein the control section determines that the brushless motor is driving when the condition that a rotation angle of the brushless motor is changing is satisfied.

6. An electric power steering apparatus comprising:
the motor control device according to claim 2;
a brushless motor configured to apply assist torque to a vehicle steering mechanism; and a torque detecting section configured to detect the value of steering torque applied to the steering mechanism, wherein the control section calculates an electric current command value and a voltage command value for the brushless motor based on the detected steering torque value and a rotation angle value of the brushless motor, and controls driving of the brushless motor based on the electric current command value and the voltage command value, and the control section determines that the brushless motor is driving when the condition that the absolute value of the electric current command value or the absolute value of the voltage command value is larger than a predetermined value is satisfied.

* * * * *